Figure 1:
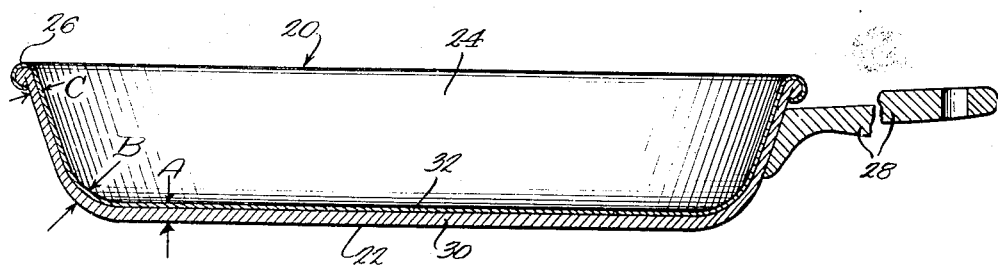

July 1, 1958  T. B. CHACE  2,841,137
CLAD METAL COOKING UTENSILS
Filed April 21, 1954

INVENTOR.
Thomas B. Chase
BY
Brown, Jackson, Boettcher & Dienner
Attys.

2,841,137

CLAD METAL COOKING UTENSILS

Thomas B. Chace, Winnetka, Ill.

Application April 21, 1954, Serial No. 424,652

1 Claim. (Cl. 126—390)

The present invention relates to clad metal cooking utensils, and particularly to improved stainless steel clad copper cooking utensils.

Copper clad stainless steel cooking utensils have met with wide acceptance in the art because of their attractiveness and practicality. Stainless steel is ideally suited for holding food stuffs because of its non-corroding and non-tainting characteristics and because of the ease of keeping the metal clean. However, stainless steel is a notoriously poor conductor of heat and not suited, per se, for cookware. For this reason, much experimentation has been conducted to coat or otherwise combine a high heat conductivity metal with the stainless steel. One practical method developed for this purpose prior to the present invention comprises the electrodeposition of a layer of copper onto the outer surface of the bottom wall of a stainless steel utensil, the maximum thickness of the two metals in the bottom wall of the completed utensil being approximately equal, whereby such utensils are referred to as copper clad stainless steel.

While affording certain advantages, such utensils suffer a severe shortcoming in terms of their cooking capabilities. In comparative cooking tests of such utensils and commercially available cast aluminum utensils, the cooking capabilities of the clad metal utensil fell far short of those of the cast aluminum. The deficiency of the clad metal utensil was particularly characterized by a substantial lack of side wall cooking, whereas the cast aluminum utensil produced a generally uniform cooking effect over the full area of its bottom and side walls. In the commercially available utensils, therefore, cast aluminum produces the best cooking results but suffers the disadvantages that it is heavy and cumbersome, requires a great amount of heat, is corrosive, is capable of tainting foods, and is not readily cleaned. On the other hand, the commercially available copper clad stainless steel utensils, while being non-corrosive, non-tainting, easily cleaned, readily and rapidly heated, and of light weight, do not afford optimum cooking characteristics.

Prior to the present invention, I proposed, in my Patent No. 2,325,659, issued August 3, 1943, a clad metal cooking utensil comprising coextensive layers of stainless steel and copper, the layer of stainless steel being relatively thin and the layer of copper being relatively thick. By virtue of the relative thicknesses of the two metals, the utensil shown in my patent is properly designated a "stainless steel clad copper" utensil. This initial difference affords advantages over "copper clad stainless steel" utensils in terms of better heat conduction, and the provision of copper on the side walls of the utensil results in considerably better cooking capabilities than afforded by the commercially available copper clad stainless steel utensils. However, even this utensil suffered certain disadvantages. First, the appearance of the utensil was marred by the existence of an "orange peel" effect on the side walls thereof. In making the utensil shown in the patent, I used rolled composite sheet stock and employed the steps of annealing the sheet to a suitable temperature for drawing the stainless steel, blanking a circle out of the sheet, and subjecting the annealed blank to a drawing operation to form the utensil. In annealing the stock to accommodate drawing of the stainless steel, the copper is subjected to unavoidable grain growth, and when the draw is effected, the margins of the enlarged cooper grains show through the stainless steel just as effectively as if the same were etched in the stainless steel, which appearance has given rise to the term "orange peel." The second disadvantage was that considerably more heat was being transmitted to the side wall of the utensil than was actually desired, therefore resulting in excessive cooking being actively carried out at the sides of the pan, rather than predominantly from the bottom as is desired. Also, the high heat transmission to the side walls resulted in a reduction in heating efficiency, from the standpoint of heat required for the utensil, since some heat was dissipated into open air due to the excellent transmission of heat to the exposed side wall of the utensil.

Thus, it is apparent that prior to the present invention, no single utensil afforded all of the desirable objectives in the art, namely, optimum cooking capabilities, light weight, convenience of cleaning, attractive appearance, efficiency of heating, and being non-corrosive and non-tainting.

The object of the present invention is to provide improved clad metal cooking utensils, particularly stainless steel clad copper utensils, meeting and fully satisfying all of the objectives of the art, and affording all of the advantages of clad metal utensils and at the same time affording optimum cooking characteristics.

Specifically, it is an object of the present invention to provide improved stainless steel clad copper cooking utensils comprising a cup-shaped member formed from a composite sheet of stainless steel clad copper stock, said member having smooth interior and exterior surfaces free of "orange peel" and including throughout the full area thereof a relatively thin interior layer of stainless steel and a relatively thick layer of copper outside of and coextensive with the interior layer of stainless steel, the member having a bottom wall of substantially uniform thickness throughout and an upstanding side wall diminishing in thickness at a uniform rate from the corner to adjacent the upper edge thereof, the corner joining the bottom and side walls being no thicker than the bottom wall and the lower portion of the side wall being no thicker than the corner, the ratio of thickness of the layers of stainless steel and copper being substantially uniform throughout the utensil.

The utensil of the present invention as above described is formed in substantially the same manner as the utensil disclosed in my Patent No. 2,325,659, with the addition of the step of cold-working the side wall of the utensil to produce a tapered wall as described. By tapering the side wall, the "orange peel" effect (which cannot be avoided in the drawing step) is eliminated, whereby the utensil is, as stated, free of "orange peel." Tapering of the side wall also affords the result of reducing the transmission of heat to the side wall to an optimum value, thereby to overcome the particular shortcoming of the utensil disclosed in my earlier patent. Tapering of the side wall in the manner described affords the third advantage of requiring less stock for the formation of a utensil of a given capacity than normally would be required, since tapering of the wall automatically results in extending the height of the side wall, thereby permitting use of a starting blank of smaller diameter than would be customary. A fourth advantage is the provision of a better balanced pan because of the relatively heavy bottom and relatively thin light side walls which permits the pan to stand empty and not be overbalanced by the weight of the handle. An additional advantage is that the amount of polishing necessary on the side wall to effect a high luster is minimized or eliminated. Due to its tapered walls, the coextensiveness of the stainless steel and copper and the maintenance of a uniform ratio of thicknesses of the stainless steel and copper throughout the utensil, the utensil of the present invention affords the particular advantages that heat is transmitted to the side walls thereof, that the ratio of heat retained by the bottom wall to the heat retained by the side wall is increased whereby cooking is carried out predominantly from the bottom of the utensil, and that the sides of the utensil are uniformly but not excessively heated to insure optimum cooking capabilities.

A further object of the invention is the provision of improved cooking utensils as defined wherein the layer of stainless steel is about 25% of the thickness of the layer of copper, the thickness of the layer of copper in the bottom wall is at least about .020 inch and the thinnest portion of the side wall of the utensil is about 65% of the thickness of the bottom wall.

A still further object of the invention is the provision of improved clad metal cooking utensils as above defined formed of either two ply or three ply stainless steel clad copper stock, the two ply stock consisting of a layer of copper and a layer of stainless steel clad to one side thereof, and the three ply stock consisting of cooper having layers of stainless steel clad to the opposite sides thereof, the two ply stock producing a utensil having a stainless steel interior and a copper exterior and the three ply stock producing a utensil having stainless steel interior and exterior surfaces and a layer of copper sandwiched between the two layers of stainless steel.

Other objects and advantages of the present invention will become apparent in the following detailed description of preferred embodiments of the invention.

Now, in order to acquaint those skilled in the art with the improved clad metal utensils of my invention, I shall describe, in connection with the accompanying drawings, preferred embodiments of the utensils and preferred manners of making the same.

Figure 2:
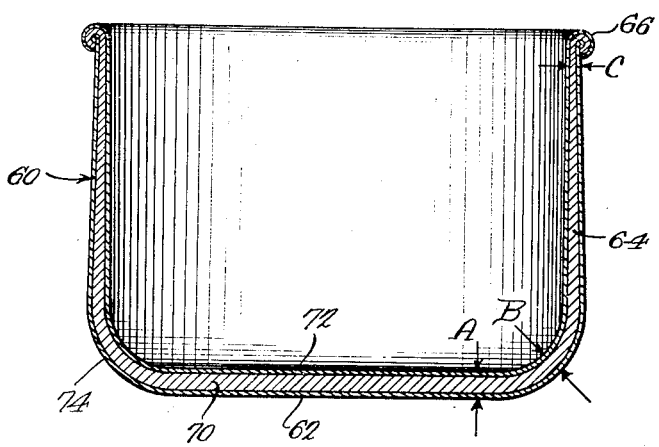

In the drawings:

Figure 1 is a vertical section of a clad metal frying pan provided in accordance with the present invention, the pan being formed of two ply stainless steel clad copper stock; and Figure 2 is a view similar to Figure 1 of a sauce pan provided according to the present invention, the sauce pan being formed of three ply stainless steel clad copper stock.

Referring now to the drawings and particularly to Figure 1, I have shown a preferred embodiment of a clad metal frying pan formed according to the present invention, the pan comprising a unitary, integral, generally cup-shaped member 20 having a bottom wall 22 and a side wall 24 provided at its upper edge with a rim 26. A handle 28 preferably extends generally radially outwardly from the side wall 24. The frying pan or cup-shaped member 20 is formed of composite stock, which comprises a relatively thick layer 30 of high heat conductivity metal, preferably copper, and a relatively thin layer 32 of non-corroding, non-tainting metal, preferably stainless steel. The stainless steel being the thinner of the two, the material is identified as stainless clad copper. The stock is preferably of the character described in my Patent No. 2,325,659 and is preferably formed in the manner generally disclosed in my copending application, Serial No. 256,105, now Patent No. 2,757,444. In the frying pan shown in Figure 1, the stainless steel is disposed to the interior of the utensil and the copper to the exterior, and the bottom or base wall is relatively thick, as indicated at the arrows A, and the side wall 24 is relatively thin and is tapered, the side wall progressively diminishing in thickness from adjacent the bottom wall, as indicated at the arrows B, to adjacent the upper free edge thereof, as indicated at the arrows C.

The thicknesses of the two layers of metal of the composite stock employed in the utensil may be varied. Generally, I have found that the stainless steel layer 32 in the utensil need be only sufficiently thick, first, to act as such restriction to heat transmission that heat applied to the center portion of the copper layer is directed outwardly over the entire area of the pan, second, to present adequate material so that the stainless layer is not polished through to the copper in the manufacture of the pan and, third, to present adequate material in the finished product to insure long and useful service. Dimensionally, the steel could be as thin as .002", but I recommend that a predetermined ratio of steel to copper, as hereinafter defined, be maintained. The copper layer on the other hand must be thick enough to have the capacity to carry heat readily and rapidly from the point of heat contact so as to spread the heat uniformly over the pan. Dimensionally, I have found that a minimum of about .020" thickness of copper in the bottom of the utensil is necessary to perform satisfactorily the function of heat transmission. In view of these approximate minimum dimensions, it would be possible to employ a composite stock .022" thick in the manufacture of a satisfactory utensil, the thickness of the steel in this case being 10% of the thickness of the copper layer. However, conventional cookware is generally formed from stock that ranges from about .025" to about .060" in thickness, and within this commercial range, I prefer to employ a steel to copper ratio of about 1:4, which of course insures at least the minimum copper thickness and a satisfactory steel thickness. Thus, the preferred relation is a steel layer about 25% as thick as the copper layer, and a copper layer having a minimum thickness in the bottom wall of the utensil of about .020".

The principal thickness dimensions of the finished utensil of the present invention are also variable according to the type or style, size and capacity of the utensil. Generally, in view of the foregoing, the dimension at A should not be less than about .025, .020" copper and .005" stainless, since the bottom of the utensil is subject to the greatest abuse and wear, and since the heat transmission capability of the copper must be fully exhibited in the bottom. In the formation of the pan or utensil, the side wall is extended upwardly and preferably outwardly from the bottom wall so that the included angle between the bottom and side walls is at least 90 degrees. The corner between the bottom and side walls is no thicker than the bottom wall, and the side wall is tapered from the corner to adjacent its upper edge. The thickness of the side adjacent the bottom, as at B, is substantially the same as, or slightly less than, that of the bottom at A, and the wall tapers or diminishes in thickness uniformly upward so that the same adjacent the upper free edge thereof is substantially thinner than the dimension at B. The limitation on the thinning of the side wall is suitably such as to afford a dimension at C of about 65% of or about one-third less than the thickness of the bottom at A. Since the side wall need not resist the wear and need not carry the amount of heat that the bottom wall must, reduction of the thickness of the side wall, is not only permissible, but affords very substantial advantages, as will presently appear. Irrespective of the dimensional variations at various portions of the pan, the ratio of thicknesses of the steel and copper layers is maintained constant over the entire area of the pan.

Bearing the foregoing in mind, a preferred embodiment of the frying pan of Figure 1 is comprised of a two ply stainless clad copper as shown, wherein the layer of stainless is approximately 25% as thick as the copper layer. In a 10" diameter frying pan, a suitable and preferred thickness of the stock is .045", in which case the stainless steel is .009" thick and the copper is .036"

thick. When the cooking utensil or frying pan is completed, the bottom of the pan is of substantially the same thickness as the starting material, so that in a 10" diameter frying pan, the dimension at A would preferably be .045". In this embodiment, the dimension at B is approximately .045", or slightly less. The thickness of the side wall adjacent the upper free edge thereof, at C, is one-third less than the thickness of the bottom wall, or .030" in the preferred 10" pan. As above noted, the ratio of thicknesses of the steel and copper layers is maintained constant over the entire area of the pan. In other words, the preferred ratio of steel to copper is 1 to 4, so that in the preferred 10" pan having a dimension at A of .045" and a dimension at C of .030", the thickness of the steel at A is .009" and at C is .006", the thickness of the copper being .036" at A and .024" at C. In smaller size pans, the general dimensional and thickness relationships above stated are adhered to, but the starting thickness of the stock is preferably less. Specifically, in an 8" diameter frying pan, I prefer the following dimensions: at A .035", at B approximately .035", at C .025"; and in a 6" diameter pan, I prefer the dimensions: at A .030", at B approximately .030", at C .020".

The pan as thus formed and constituted exhibits an interior surface of stainless steel, which is non-corroding and non-tainting and thus ideally or optimumly suited for holding foodstuffs. The high heat transfer metal, or layer of copper, is provided to impart to the utensil the best characteristics in meeting the requirement of efficient heat transfer. In cooking, heat is generally applied to the central portion of the utensil and it is essential, if cooking is to be carried out properly, that the heat be rapidly and uniformly distributed over the bottom of the utensil. The copper is an excellent heat conductor and an adequate amount of copper is provided to insure full capacity of heat flow or transfer. The stainless steel layer acts as a restriction to conductance of heat to the contents of the utensil, so that heat applied to the central portion of the pan is distributed uniformly over the bottom of the utensil. The copper layer is relatively thick to store substantial heat and the stainless steel layer is relatively thin to accommodate quite ready transmission of this stored heat, whereby the heat is transmitted uniformly through the bottom of the utensil to the contents thereof. In addition, the copper layer extends upwardly on the side wall of the utensil to transmit heat to the contents of the utensil, thus to insure uniform and proper heating of the contents and to eliminate localized hot spots or the like. Of major importance is the fact that the side walls are tapered to relative thinness with respect to the bottom wall of the pan. By thinning the side walls, sufficient heat is uniformly distributed over the side walls to insure uniform cooking and to guard against burning and sticking of the contents to the side wall of the vessel. At the same time, the relatively thin side walls do not draw so much heat from the bottom wall of the pan as to be wasteful, and the majority of the heat is confined in the bottom of the pan, a basic requirement in cooking utensils, to insure optimum cooking characteristics.

The rim 26 of the pan preferably comprises a completely closed rolled bead, which affords the advantages that no sharp edges are exposed, no food or other matter can enter the interior of the bead to become contaminated or present an unsanitary condition, and the bead thus presents to the exterior of the pan a silvery ring bounding the copper to enhance the appearance of the utensil. In addition, the bead 26 rigidifies the side wall of the utensil to prevent bending and deformation. Yet, the bead does not affect the optimum cooking characteristics of the utensil, since the utensil would not be filled above the point C.

Other configurations of the lip or rim portion of the side wall, and of the general outline or shape of the utensil as well, may of course be employed within the scope of the present invention.

The handle 28 of the frying pan may take any suitable or customary form desired. I have successfully employed cast brass handles riveted to the pan. Also, cast and stamped stainless steel handles can either be riveted to the pan or spot welded to the stainless steel layer of the pan through the copper layer. The brass handle affords esthetic advantages in conjunction with the copper outer surface of the pan, while the stainless handle affords a slightly lesser degree of attractiveness. However, the stainless steel handle, because of its lower coefficient of heat transfer, economy of formation in production, and its greater ease of attachment to the pan, is a preferred handle. Conventional forms of insulated handles and handles formed of insulating materials may, of course, also be employed.

The two ply clad metal frying pan thus afforded is a very attractive item exhibiting a shiny stainless steel interior and a copper exterior, which immediately enhances the salability of the item. The pan is light in weight being formed of thin stock, is non-corroding and non-tainting since food is exposed only to the stainless steel interior surface of the pan, and is readily and conveniently cleaned and maintained sanitary with a minimum of care. Also, because of its light weight and the thin stock from which it is formed, and because of its extremely efficient heat transfer characteristics, the pan requires a minimum of heat to maintain a given temperature within the interior of the pan. Most importantly, however, the frying pan affords optimum cooking characteristics. Frying pans in a variety of sizes formed in accordance with the foregoing have been subjected to the most severe cooking and use tests known and have afforded perfect results. On the basis of comparison, only cast aluminum pans approach the cooking characteristics of the utensils of the invention and these, of course, suffer the hereinbefore enumerated disadvantages of excessive weight, food tainting, and lack of ready cleaning.

The attractive two ply copper-stainless utensils above referred to are ideally suited to domestic use because of their practicality and beauty. In commercial and institutional kitchens, however, stainless steel utensils, i. e., those having stainless steel exteriors as well as interiors, are preferred because of the ease of keeping the utensils clean and sanitary, and of having the utensils clearly exhibit such sanitary condition. A three ply clad metal stock comprising relatively thin outer layers of stainless steel and a relatively thick intermediate layer of copper, which is disclosed in my said copending application, now Patent No. 2,757,444, is ideal for these institutional cooking utensils, and it is to be understood that the utensils of the present invention can be formed of such three ply stock, as well as two ply stock.

The three ply composite stock referred to is provided commercially in a variety of ratios of relative thickness of the metal layers, two well known forms of which comprise 40% copper and 60% copper, respectively. For purposes of the present invention, the 60% copper three ply stock is more acceptable than the 40% (although the latter may satisfactorily be employed), since the layers of steel each have a thickness of 20% of the stock and thus have a steel to copper ratio of 1 to 3, which quite closely approximates the metal to metal ratio limitation hereinbefore described.

In the formation of the cooking utensils of the present invention from three ply, clad metal stock of the character above described, the same general dimensional relationships as above started are preferably adhered to, although the stock employed as a starting material may suitably be somewhat thicker than the preferred two ply stock, thus to afford greater resistance to the abuse to which utensils are subjected in commercial kitchens, and to insure an adequate thickness of copper for the transmission of heat. Heat applied to the stainless outer layer of the pan is transmitted directly through this layer to the copper layer, which rapidly distributes the heat throughout the full area of the utensil and stores the heat for transmission through the relatively thin interior layer of steel uniformly and efficiently to heat the contents of the utensil.

In view of the desirability of three ply clad metal stock for certain utensils, I have shown in Figure 2 a sauce pan formed of such stock. It is to be understood, of course, that the sauce pan may, if desired, be formed of the two ply stock described in conjunction with Figure 1, the two ply stock being preferred for domestic use and the three ply stock for institutional use.

Referring now to Figure 2, the clad metal sauce pan shown therein conforms generally to the frying pan shown in Figure 1, and is manufactured in conformity with the limitations or specifications as set forth hereinbefore. The pan comprises a unitary, integral, generally cup-shaped member 60 having a relatively thick bottom wall 62 and a relatively thin, tapered side wall 64. The side wall at its upper free edge is provided with a completely closed rolled bead or rim 66 affording the advantages above noted with respect to the rim 26 of the frying pan. If desired, other rim configurations may be employed. The sauce pan, the same as the frying pan, may be provided in any suitable manner with such handle means (not shown) as may be desired or conventional in the art for various capacities of sauce pans.

The preferred stock for the pan comprises a relatively thick intermediate layer 70 of high heat conductivity metal, preferably copper, and relatively thin outer layers 72 and 74, respectively, of non-corroding, non-tainting metal, preferably stainless steel. As in the previous description of the two ply stock, the copper layer in the bottom of the utensil and thus of the starting stock, has a minimum thickness of about .020". The percentage thickness of each layer of steel to the thickness of the copper layer again is preferably about 25%. In commercially accepted stock thicknesses of .025" to .060", the ratio of each layer of steel to the layer of copper at the lower stock thickness would have to be about 1 to 8, but in thicknesses from about .030" on up, the preferred ratio of 1:4 can be adhered to. Despite the use of three ply stock as opposed to two ply stock, the relative dimensional specifications of the sauce pan are the same as those of the frying pan, namely, the thickness of the thinnest portion of the side wall 64 being about one-third less than the thickness of the bottom wall. Specifically, the thickest dimension of the pan is in the uniform bottom wall 62 thereof, as indicated at the arrows A, and the side wall 64 is tapered, having a dimension adjacent the bottom wall, as indicated at the arrows B, approximately the same as, or slightly less than, the dimension at A, and having a dimension adjacent the upper free edge thereof, as indicated at the arrows C, of substantially less than the dimension at A, namely about 65% of the thickness at A. In addition, sauce pans in decreasing capacities may suitably employ progressively thinner composite stock, as was the case with the clad metal frying pan previously described. For example, a one pint sauce pan could be equated generally to a 6" frying pan, a one quart sauce pan to an 8" frying pan, and a two quart sauce pan to a 10" frying pan. In all variations, the ratio of steel to copper is preferably maintained constant throughout the full area of the pan.

The sauce pan as thus formed and constituted exhibits an interior surface, preferably stainless steel, which is non-corroding and non-tainting and thus ideally or optimumly suited for holding foodstuffs. Outwardly of this layer, a relatively thick layer of high heat conductivity metal, preferably copper, is provided to impart to the utensil the best characteristics with respect to uniform and efficient transfer of heat throughout the bottom wall of the utensil. The relatively thin, tapered side wall of the utensil is of major importance in that the same accommodates and insures uniform distribution of heat in the side walls of the utensil or sauce pan, while at the same time maintaining the degree of heat in the side walls substantially less than the heat transmitted through the bottom wall of the utensil to the contents thereof, whereby cooking is carried out in an optimum manner predominantly from the bottom of the vessel, and without burning of the contents of the utensil, and without the contents of the utensil in any way sticking or adhering to the side walls of the sauce pan. All in all, then, it is to be appreciated that clad metal sauce pans as constructed in accordance with the present invention, as above described, will afford perfect cooking characteristics even when subjected to the most severe cooking and use tests known. At the same time, the improved sauce pan meets the requirements set forth hereinbefore with respect to the characteristics of the frying pan, of being light weight since formed of thin stock, being non-corroding and non-tainting since food is exposed only to the stainless steel interior surface, being readily and conveniently cleaned and maintained sanitary with a minimum of care, and of requiring only a minimum amount of heat to maintain a given temperature within the interior of the pan. Accordingly, the sauce pan of the present invention corresponds very substantially, both in structure and results, to the frying pan described in greater detail hereinbefore.

In addition, utensils as formed of three ply stock exhibit a relatively thin outer layer of stainless steel, which resists corrosion and other disfiguring scars or blemishes, and which is very readily cleaned, whereby the utensils not only are easily maintained sanitary, but clearly exhibit such condition. Also, the stainless steel exterior affords a very high resistance to wear, thus insuring a long and useful life for the utensil. At the same time, the presence of the outer layer of steel, while not substantially impeding heat transmission, acts to insulate the copper layer to an extent so that the copper layer stores substantial heat for transmission to the contents of the utensil.

A further characteristic of the utensils of the present invention is that the same are free of "orange peel." This is a very important and novel feature in utensils formed of a composite stainless steel clad copper stock. The feature is brought to fruition by the tapering of the side walls and preferably by cold-working the side walls to finish dimensions. Specifically, a circular blank of the composite sheet stock is initially drawn into the shape of a shallow cup and the side wall thereof is then cold-worked to taper the side wall to the dimensions herein defined. This results in elongation of the wall, whereby the starting blank is of smaller diameter than is customary and the initial draw shallower than usual. Tapering of the side wall by cold-working also results in elimination of the "orange peel" effect which appears on the side wall after the initial draw, thereby to afford a very attractive utensil of low cost requiring little if any final polishing or buffing. Moreover, tapering of the side wall results in a light weight stable utensil, the relatively heavy bottom of which retains the utensil in balance despite the unbalancing mass of the handle.

From the foregoing, it is to be appreciated that the present invention affords highly improved clad metal cooking utensils characterized by a relatively thick bottom wall and a side wall that is tapered to a thickness substantially less than that of the bottom wall, and by a relatively thick layer of high heat conductivity metal extending throughout the full area of the utensil. These features distinguish the utensils of the present invention from prior endeavors in the art and lead to the provision of a truly practical cooking utensil affording in a single unit all of the advantages enumerated hereinbefore. Thus, the objects of the present invention have been shown to be attained in a convenient, economical and practical manner.

While I have shown and described what I regard to be preferred embodiments of the cooking utensil of my invention, it is to be appreciated that various changes, rearrangements and modifications may be made therein without departing from the scope of the invention, as defined by the appended claim.

I claim:

A stainless steel clad copper cooking utensil comprising a unitary member of cup-shape formed from a composite sheet of stainless steel clad copper stock, said member having smooth interior and exterior surfaces free of "orange peel" and including throughout the full area thereof a relatively thin interior layer of stainless steel and a relatively thick layer of copper outside of and coextensive with said interior layer of stainless steel, the thickness of said layer of stainless steel being about 25% of the thickness of the layer of copper, said member having a thick planar bottom wall of uniform thickness throughout, the thickness of the layer of copper in said bottom wall being at least about .020 inches to effect rapid uniform distribution of heat over the entire bottom wall of said member, said member having a side wall extending upward at a constant angle of inclination from said bottom wall, the included angle between said bottom and side walls being at least 90 degrees, the corner joining said walls being no thicker than said bottom wall to avoid localized heating at the corner and excessive transmission of heat to the side wall, said side wall being no thicker than said corner and diminishing in thickness at a uniform rate from said corner to adjacent the upper edge thereof to afford a progressively diminishing distribution of heat over the side wall from the bottom to the top thereof, the thickness of the thinnest portion of said side wall being about 65% of that of said bottom wall to afford an effective distribution of heat over the side wall and to balance the cup-shaped member, the ratio of thickness of said layers of stainless steel and copper being substantially uniform throughout the utensil to provide for a substantially uniform ratio of heat transmission from the copper through the stainless steel.

References Cited in the file of this patent

UNITED STATES PATENTS

| | | |
|---|---|---|
| 65,850 | Wilson | June 18, 1867 |
| 271,745 | Schifferle | Feb. 6, 1883 |
| 869,340 | Walworth | Oct. 29, 1907 |
| 1,757,989 | Acton | May 13, 1930 |
| 1,966,713 | Flint | July 17, 1934 |
| 2,034,057 | Reuss | Mar. 17, 1936 |
| 2,053,096 | McKay et al. | Sept. 1, 1936 |
| 2,208,606 | Smith | July 23, 1940 |
| 2,254,570 | Hailey | Sept. 2, 1941 |
| 2,272,609 | Kennedy et al. | Feb. 10, 1942 |

FOREIGN PATENTS

| | | |
|---|---|---|
| 583,075 | Great Britain | Dec. 6, 1946 |